V. PERELZVEICH & G. ROSENBUSCH.
HEATING DEVICE.
APPLICATION FILED JULY 2, 1908.

922,503.

Patented May 25, 1909.

Witnesses:
Jacques Billeter
T. Diller

Inventors:
Victor Perelzveich
Gustav Rosenbusch

UNITED STATES PATENT OFFICE.

VICTOR PERELZVEICH AND GUSTAV ROSENBUSCH, OF ZURICH, SWITZERLAND.

HEATING DEVICE.

No. 922,503.　　　Specification of Letters Patent.　　　Patented May 25, 1909.

Application filed July 2, 1908. Serial No. 441,702.

*To all whom it may concern:*

Be it known that we, VICTOR PERELZ-VEICH, a citizen of the Russian Empire, residing at 76 Sonneggstrasse, Zurich, V, Switzerland, and GUSTAV ROSENBUSCH, a citizen of the German Empire, residing at 76 Sonneggstrasse, Zurich, V, Switzerland, have invented a new and useful Heating Device, of which the following is a specification.

Our invention relates to improvements in devices for heating vessels, kettles and the like with solidified spirit.

The object of our invention is to provide a device which will be of simple, durable and comparatively inexpensive character.

A further object of our invention is to provide a heating device which is well adapted for heating vessels of very different sizes and which may be packed closely for traveling purposes.

Still further the object of our invention is to create a heating device with a burner adjustable in respect to the vessel to be heated.

With these objects in view the invention consists of certain novel features of construction combination and arrangement of parts, as will be more fully described and particularly pointed out in the appended claims.

Figure 4:
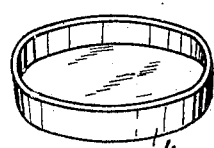
Figure 5:
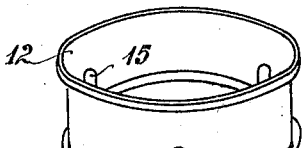
Figure 1:
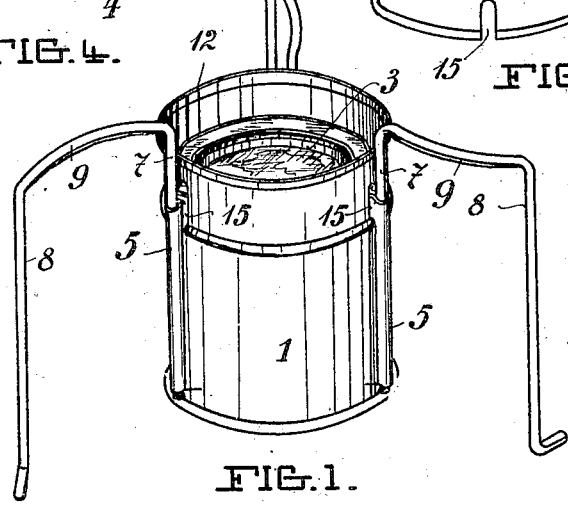
Figure 2:
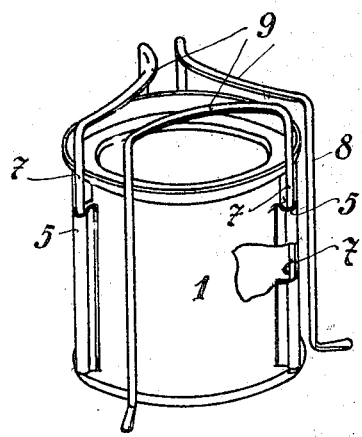
Figure 3:
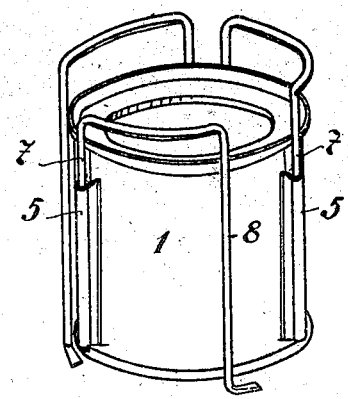

In the accompanying drawings Figure 1 is a perspective view of our improved heating device in its opened position. Fig. 2 is a similar view, the support for carrying the vessels being turned inside, Fig. 3 is a similar view the heating device being in its closed position. Fig. 4 shows the cover and Fig. 5 a mantle in perspective views.

Like numerals refer to like parts throughout the several views.

Referring to the drawings numeral 1 denotes a receptacle or container in the form of a tin can, preferably of circular cross section. The receptacle 1 is provided at its top with an opening 3 adapted to be shut by means of a tightly fitting cover 4. The receptacle 1 contains spirit in solid form. To the side wall of the receptacle 1 sleeves 5 of bent sheet metal are fixed at regular intervals. In each of the said sleeves 5 is one shank 7 of a U-shaped support 8 adjustably mounted and held by frictional engagement. The supports 8 are preferably of wire with circular cross section. The middle parts 9 of the supports 8 are bent out of the plan of the shank and flattened as shown in the drawings while the free ends of the shanks 10 are bent outwardly, in order to give to the supports a good footing. The supports 8 may be swung in the sleeves 5 in any direction and the receptacle 1 may be raised or lowered on the shanks according to requirements.

As will be readily seen the heating device can be advantageously used for very different sizes of heating receptacles the supports being easily adjustable according to the size of the bottom of the receptacle to be heated. When out of use the supports 8 are laid on the side wall of the receptacle as shown in Fig. 3 and the cover 4 placed in the opening 3.

When it is desired to use the heating device the cover is taken off the receptacle 1 and the solid spirit is ignited by means of a lighted match applied to the opening 3. The supports 8 are adjusted according to the size of the bottom of the receptacle to be heated.

To guide the flames against the bottom a ring or mantle 12 may be used. The ring 12 is adapted to slide over the receptacle 1 and for this purpose it is provided with slots 15 engaging the sleeves 5 of the receptacle 1. Space is left between ring 12 and side wall of the receptacle to allow the inflow of sufficient air to support combustion. After use the flame of the heating device is extinguished by forcing cover 4 in the opening 3 of receptacle 1 and the supports 8 are laid as aforesaid upon the side wall the ring 12 being left upon the receptacle 1 between the supports. When the parts of the heater are thus arranged, the device is materially reduced in size and may be conveniently carried in one's pocket or in a lunch basket etc.

The device may be constructed of any suitable material and may be in any desired shape.

Various other changes in the form proportion and the minor details of construction may be resorted to without departing from the principle or sacrificing any advantages of the invention.

We claim:—

1. A heating device comprising in combination, a burner, and a plurality of inverted U-shaped supporting members therefor, one limb of each member being adjustably secured to the burner and the other limb of each member acting as a supporting foot for the burner, the bases of said U-shaped members lying above and overhanging the burner when collapsed against the same.

2. A heating device comprising in combination, a burner, and a plurality of inverted U-shaped supporting members therefor, one limb of each member being pivotally and adjustably secured to the side of the burner and the other limb of each member acting as a supporting foot for the burner, the bases or connecting portions of said U-shaped members lying above and overhanging the burner when collapsed against the same.

3. A heating device comprising in combination, a burner, and a plurality of inverted U-shaped supporting members therefor, said burner being provided with sleeves peripherally disposed thereon, one limb of each member being pivotally and adjustably mounted to one of said sleeves and the other limb of each member acting as a supporting foot for the burner, the bases of said U-shaped members lying above and overhanging the burner when collapsed against the same.

4. A heating device comprising in combination, a burner in the form of a receptacle open at its upper or top portion, and provided with a plurality of peripherally disposed sleeves, a cover for closing said opening, and a plurality of inverted U-shaped supports upon which said burner is vertically adjusted, one limb of each support being adjustably secured in one of said sleeves and the other limb serving as a supporting foot.

5. A heating device comprising in combination, a burner in the form of a receptacle provided with an open top and a plurality of peripherally disposed sleeves, a plurality of inverted U-shaped supports on which said burner is vertically adjustable, one limb of each support being disposed in one of said sleeves and the other limb acting as a supporting foot, a cover fitting the opening of said burner, and a ring provided with slots and adapted to fit over the receptacle substantially as described and shown.

In testimony whereof we affix our signatures in presence of two witnesses.

VICTOR PERELZVEICH.
GUSTAV ROSENBUSCH.

Witnesses:
JOSEPH SIMON,
A. LIEBERKNECHT.